(12) United States Patent
Kudo et al.

(10) Patent No.: US 6,236,036 B1
(45) Date of Patent: May 22, 2001

(54) MULTI-OPTICAL-PATH PHOTOSWITCH WITH CAPABILITY OF DETECTING MULTIPLE LIGHT EMISSION

(75) Inventors: Motohiro Kudo; Keisuke Murakami, both of Osaka (JP)

(73) Assignee: Keyence Corporation, Osaka (JP)

( * ) Notice: Subject to any disclaimer, the term of this patent is extended or adjusted under 35 U.S.C. 154(b) by 0 days.

(21) Appl. No.: 09/227,215

(22) Filed: Jan. 8, 1999

(30) Foreign Application Priority Data

Mar. 6, 1998 (JP) .................................................. 10-154784

(51) Int. Cl.[7] .................................................. G06M 7/00
(52) U.S. Cl. ........................................ 250/221; 250/222.1
(58) Field of Search ................................. 250/221, 222.1, 250/553; 340/555, 556, 557

(56) References Cited

U.S. PATENT DOCUMENTS

| | | | |
|---|---|---|---|
| 4,063,085 | 12/1977 | Montanvert | 250/221 |
| 4,749,853 | 6/1988 | Salim | 250/221 |
| 4,797,547 | * 1/1989 | Blanc et al. | 250/221 |
| 5,640,006 | 6/1997 | Anzai et al. | 250/221 |

FOREIGN PATENT DOCUMENTS

| | | |
|---|---|---|
| 2023282 | 12/1979 | (GB) . |
| 2227093 | 7/1990 | (GB) . |

* cited by examiner

*Primary Examiner*—F L Evans
(74) *Attorney, Agent, or Firm*—Morgan, Lewis & Bockius LLP

(57) ABSTRACT

The structure is constituted by light-emission control means 23 and 24, a plurality of light emitting devices 21 which are sequentially operated and controlled in response to light-emission-timing signals supplied from the light-emission control means 23 and 24, a plurality of light receiving devices 31 forming pairs with the plural light emitting devices 21 so as to receive light emitted from the corresponding light emitting devices, light-receipt control means 33 and 34 for enabling light-receipt signals supplied from the plural light receiving devices 31 to be received in synchronization with light-emission-timing signals, voltage detection means 25 for detecting operation voltages which are supplied to the plural light emitting devices 21 and an abnormal state detection means 26 for detecting an abnormal operations of the plural light emitting devices in accordance with the operation voltages detected by the voltage detection means 25.

5 Claims, 13 Drawing Sheets

MULTI-OPTICAL-PATH PHOTOSWITCH WITH CAPABILITY OF DETECTING MULTIPLE LIGHT EMISSION

BACKGROUND OF THE INVENTION

The present invention relates to a multi-optical-path photoswitch having pairs of light emitting devices and light receiving devices, in which one of light receiving device is enabled to receive the light in synchronization with emission of the corresponding one of light from light emitting devices in a detection area so as to detect a light shielding state in the detection area. More particularly, the present invention relates to a multi-optical-path photoswitch which is able to avoid incorrect detection which is caused from, for example, occurrence of a multiple light emission state.

The multi-optical-path photoswitch is a switch incorporating a plurality of optical paths or channels constituted by pairs of light emitting devices of a light emitting unit and light receiving devices of a light receiving unit and arranged to be switched on when any one of the optical paths is shielded by an object. Hereto, the foregoing switch has been known as an "area sensor" which is capable of detecting existence of an object over a wide detection area. The multi-optical-path photoswitch is used to improve safety of an operator of a machine tool, a punching machine, a pressing machine, a controller, a molding machine, an automatic controller, a winding machine, a robot, a casting machine or the like. The foregoing multi-optical-path photoswitch is disposed in a dangerous region for a pressing machine or the like to detect shielding of an optical-path which is caused when a portion of the body of an operator, for example, the finger or the hand of the operator, enters the detection area. Thus, the operation of the machine is immediately interrupted or an alarm is issued to protect the operator.

The multi-optical-path photoswitches are disposed along automatic manufacturing lines in a plant to detect existence of moving articles. Thus, the multi-optical-path photoswitches are employed as sensors in an automatic control system with which starts operating a next step if an article is detected.

As a multi-optical-path photoswitch of the foregoing type, for example, the following "multi-optical-path photoswitch (hereinafter called a conventional example), is known. The conventional example has a schematic structure as shown in FIGS. 12 and 13. FIG. 12 is an overall structural view showing the conventional multi-optical-path photoswitch. FIG. 13 is a circuit diagram of a light emitting unit 102. Referring to FIG. 12, the conventional multi-optical-path photoswitch incorporates a plurality of pairs (eight pairs) of light emitting devices 211 to 218 and light receiving devices 311 to 318 forming pairs. In response to a signal supplied from a light-emitting-device control circuit 124, light-emitting-device driving circuits 1291 to 1298 in a light emitting circuit 123 are operated so as to cause the light emitting devices 211 to 218 to sequentially emit light into a detection area. On the other hand, a group of the light receiving devices 311 to 318 is connected to a light receiving circuit 103 having a plurality of input terminals. Only one light receiving device among the group of the light receiving devices 311 to 318, forming a pair with a light emitting device which is currently emitting light, is enabled to receive light by the light receiving circuit 103 in synchronization with light emitting timing of the light emitting device. That is, the light receiving devices are operated at only light emission timing of the corresponding light emitting devices so that each light receiving device does not respond to a light emitted from a light emitting device of which light emitting timing is different from that of the light receiving device on the corresponding optical-path.

In the foregoing case, to sequentially turn the light emitting devices 211 to 218 on, the light emitting circuit 123 has a structure arranged, for example, as shown in FIG. 13. That is, shift registers 1271 to 1278 are connected to the corresponding light emitting devices 211 to 218. Moreover, the shift registers 1271 to 1278 are serially connected to one another. A clock signal is transmitted from a terminal C of the light-emitting-device control circuit 124. At output timing of the clock signal, the states of outputs of the shift registers 1271 to 1278 are sequentially shifted. The foregoing structure is also adapted to the light receiving circuit 103.

Light receipt signals from the light receiving devices 31 to 318 are amplified by received-signal amplifiers, and then supplied to a comparison circuit through a selection circuit having a structure of a shift register and, the light receipt signals are compared with a predetermined reference level by the comparison circuit. If it is detected that a quantity of light received by any one of the light receiving devices is reduced, it is determined that an object has passaged into an optical-path, which is formed by the corresponding light emitting device and the light receiving device, in the detected area.

When one light emitting device is emitting light, only one light-receipt signal from the light receiving device, which forms a pair with the foregoing light emitting device, is made to be receivable and, the reason for this will be described as follow. That is, light emitted from the light emitting device is not always incidented into the corresponding light receiving device. Light with relatively strong intensity might be sometimes received by an adjacent light receiving devices. Therefore, if a structure is designed so that lightreceipt signals from all of the light receiving devices are equally supplied to one comparison circuit, it might be incorrectly determined that the current state is a light receipt state though the optical-path is actually in a light shielded state because of passage of an object.

If the circuit for operating the light emitting devices 211 to 218 in the light emitting unit 102 is suffered from a breakdown, the light emitting devices 211 to 218 are not sequentially turned on at predetermined timing even in a case where the shift registers 1271 to 1278 are normally operated. Therefore, it arises a problem which two or more light emitting devices emit their lights simultaneously (called as "multiple light emission"in this specification). Even in a case where an passaging object shields the optical-path which exists, with this multiple light emission, light emitted from another light emitting device is not shielded. Thus, there is apprehension that the light might be incidented on the light receiving device corresponding to the light emitting device having the light emitting timing. Thus, the light-shielded states cannot be determined correctly because the light receiving unit 103 receives a signal emitted from the light emitting device. In addition to a breakdown of the control circuit and the operation circuit of the light emitting device, it can be considered that multiple light emission occurs if incorrect data is set to any one of the shift registers 1271 to 1278 because of noise or the like.

To prevent the incorrect detection which occurs owning to generation of multiple light emission, the multi-optical-path photoswitch according to the conventional example employs the following technique: that is, the foregoing conventional example has a structure incorporating an electric-current detection circuit 126 for detecting electric currents which are supplied to the light emitting devices 211 to 218. Moreover, the structure incorporates a state detection means 126b for communicating, to outside, occurrence of an abnormal state in the operations of the light emitting devices 211 to 218. The communication is established when the detected electric current levels detected by the electric-current detection circuit 126 exceed a range of load electric currents required to turn the light emitting devices having the turning-on timing on.

That is, the foregoing conventional example have a structure that load electric currents in the plural light emitting devices 211 to 218 which are sequentially turned on at predetermined timing are detected by the electric-current detection means 126. Then, the state detection means 126b determines whether or not the detected electric current levels satisfy the predetermined range. Thus, if a load electric current exceeding the range of the load electric current required to turn one light emitting device on is detected, that is, if a multiple light emission state in which a plurality of the light emitting device are simultaneously turned on at certain light emission timing is realized, the foregoing state can be detected. Thus, reliability of the operation for detecting the light shielded state can be improved.

However, the conventional multi-optical-path photoswitch is adapted to a method in which the sum of electric currents which flow in the light emitting devices is detected to determine occurrence of multiple light emission if an electric current is not lower than a predetermined value of an electric current flow. Therefore, the circuit must have specifications that electric currents which flow in all of the light emitting devices are substantially the same. Therefore, there arises a problem in that setting of different electric current levels to optical paths for the purpose of adjusting effective angular apertures cannot be performed. That is, the multi-optical-path photoswitch is sometimes enabled to easily obtain required effective angular aperture and easiness with which the optical paths can be adjusted by individually setting, to the optical paths, electric currents which flow in light emitting devices corresponding to the optical paths. However, there arises a problem in that the conventional multi-optical-path photoswitch cannot set electric currents individually to the optical paths and design freedom is limited because electric currents which flow in the light emitting devices corresponding to the optical paths are substantially the same.

As described above, the multiple light emission takes place because of supply of an incorrect signal to the light emitting device, for example, setting of incorrect data which occurs because of breakdown or noises of the light emitting circuit (the control circuit and the operation circuit). In addition to the foregoing cause, multiple light emission takes place if metal foreign material has passed into the apparatus or if output terminals of the control circuit of the light emitting device owning to a bridge of solder which is generated in a process for mounting elements on a substrate. If the control circuit of the light emitting devices incorporates a usual logic IC, an output signal of the control circuit enables a poor voltage amplitude which is about half of "H" level which is generated in a normal case. Also an electric current which flows in one light emitting device is made to be about half. Therefore, the conventional method with which the sum of electric currents which flow in light emitting devices is detected cannot easily detect the multiple light emission.

SUMMARY OF THE INVENTION

In view of the foregoing, an object of the present invention is to provide a multioptical-path photoswitch which detects an abnormal state in the operation of a light emitting device, such as multiple light emission or the like, which takes place when undesirable passage of metal foreign matter into the apparatus or a bridge of solder when elements are mounted on a substrate so as to prevent incorrect detection which occurs owning to, for example, generation of a multiple light emission state and to enable a light shielded state to furthermore quickly be detected. The foregoing abnormal state in the operation takes place owning to a breakdown or a noise of a light emitting circuit (a control circuit or an operation circuit) of the light emitting device or supply of an incorrect signal to the light emitting device, such as setting of incorrect data which occurs because of a breakdown or noise. Moreover, the abnormal state takes place owning to short circuit of output terminals of the control circuit of the light emitting device which occurs if output terminals of the control circuit of the light emitting device are short-circuited because of passage of metal foreign matter into the apparatus or generation of a bridge of solder when elements are mounted on a substrate.

To achieve the above-mentioned object, according to a first aspect of the present invention, there is provided a multi-optical-path photoswitch which is capable of detecting multiple light emission, incorporating: a plurality of light emitting devices; light-emission control means for transmitting a signal for determining predetermined light emission timing; light-emitting-device driving circuits for sequentially operating the plural light emitting devices in response to light-emission-timing signals supplied from the light-emission control means; a plurality of light receiving devices forming pairs with the plural light emitting devices to receive light emitted from the corresponding light emitting devices; and light-receipt control means for enabling a light-receipt signals transmitted from the plural light receiving devices in synchronization with the light-emission-timing signals, the multi-optical-path photoswitch comprising: voltage detection means for detecting a voltage at an input end or an output end of each of the light-emitting-device driving circuits; and abnormal state detection means for detecting abnormal operations of the plural light emitting devices in accordance with the operating voltage detected by the voltage detection means.

According to a second aspect of the present invention, wherein the voltage detected at the input end by the voltage detection means is a voltage of the light-emission-timing signal.

A third aspect of the present invention has a structure wherein the light-emitting-device driving circuits have a plurality of switching means for turning on or off an electric current which is supplied to each of the light emitting devices in response to the light-emission-timing signal supplied to each of the light emitting devices.

A fourth aspect of the present invention has a structure wherein the voltage detection means has a resistance network for collecting the voltages of the light-emitting-device driving circuits into one voltage, and the abnormal state detection means is a comparison circuit which receives an output of the resistance network at an end thereof and receives a reference potential at another end thereof and which transmits an abnormal signal.

A fifth aspect of the present invention has a structure wherein the abnormal state detection means has two comparison circuits, a reference potential of one of the comparison circuits is lower than a value of an output of the resistance network which is produced when duplex light emission has been performed because of a malfunction of the light-emission control means and higher than a value of an output of the resistance network which is produced in a normal state, a reference potential of the other comparison circuit is higher than a value of an output of the resistance network which is produced when duplex light emission has been performed because of short circuit between output terminals of the light-emission control means and lower than a value of an output of the resistance network which is produced in a normal state.

As a result, an abnormal state in the operation which takes place owning to a breakdown or a noise of a light-emission control means or supply of an incorrect signal to the light emitting device, such as setting of incorrect data which occurs because of a breakdown or noise, short circuit of output terminals of the control circuit of the light emitting device which occurs if output terminals of the control circuit of the light emitting device are short-circuited because of passage of metal foreign matter into the apparatus or generation of a bridge of solder when elements are mounted on a substrate can be detected without exception. Thus, incorrect detection which takes place owning to generation of a multiple light emission state can be prevented. Moreover, detection of a light shielded state can reliably be detected.

If voltages which are detected in the cases corresponding to causes of abnormalities of the operation are previously recognized, a cause of an abnormal state of the operation can be detected in accordance with a voltage level detected by the voltage detection means. Since the voltage detection means is realized by a star-shape resistance network or the like to cause the multiple-light-emission detection means to detect an abnormal operation in accordance with one detected voltage level, the size of the circuit can be reduced. Since the method monitoring operation voltages which are supplied to the light emitting devices is employed, any influence of the values of electric currents which flow in the light emitting devices is not exerted on the operation for setting an optimum electric current value for each optical paths. Thus, design freedom can be improved.

DETAILED DESCRIPTION OF THE PREFERRED EMBODIMENTS

Embodiments of a multi-optical-path photoswitch according to the present invention will now be described with reference to the drawings.

Figure 1:
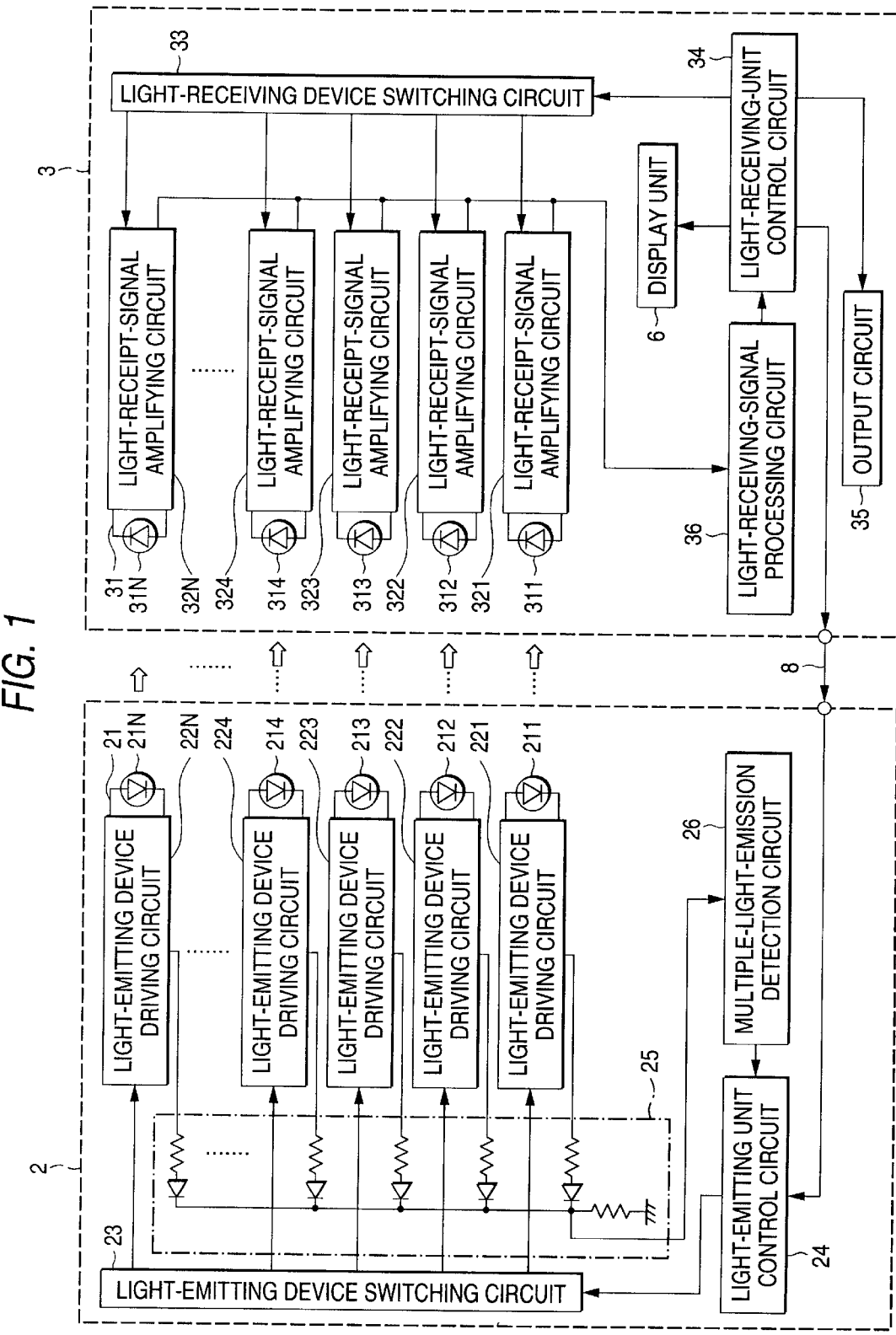
FIG. 1 is a schematic view showing a multi-optical-path photoswitch according to an embodiment of the present invention.
Figure 2:
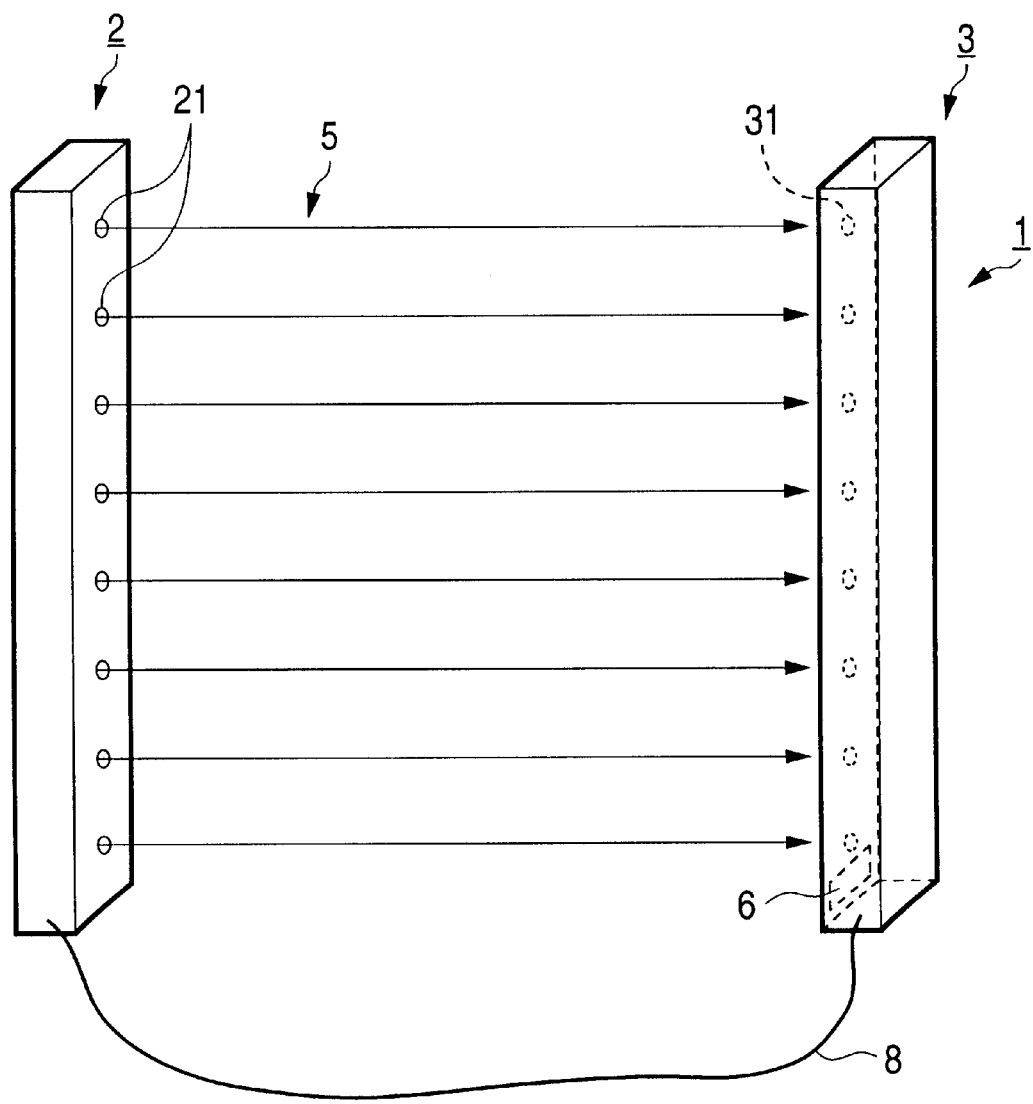
FIG. 2 is an overall perspective view showing the multi-optical-path photoswitch according to the -embodiment of the invention.
Figure 3:
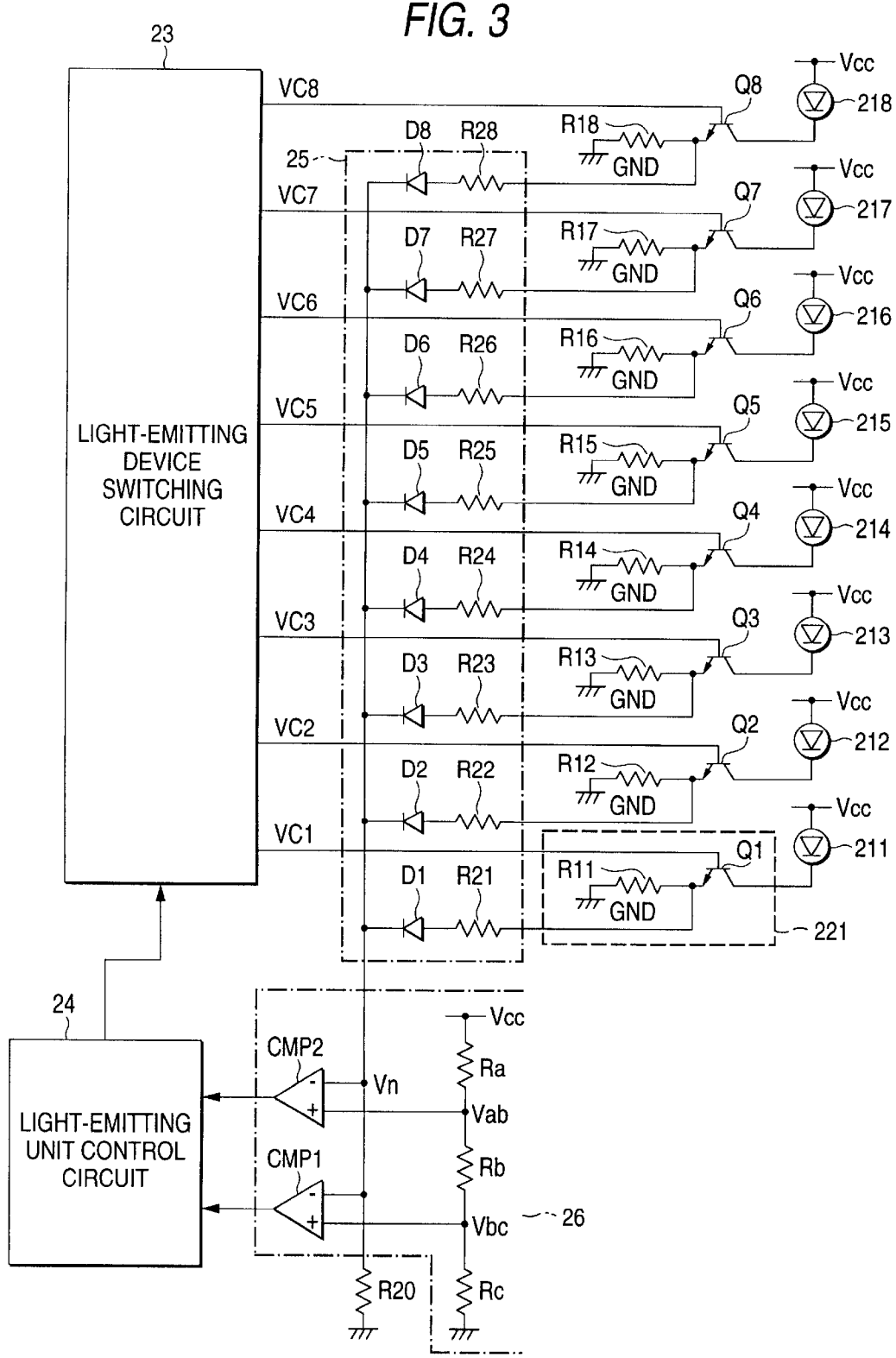
FIG. 3 is a detailed circuit diagram showing an essential portion of a light emitting unit of the multi-optical-path photoswitch (having eight optical paths) according to the embodiment of the invention.

FIG. 1 is a schematic view showing the multi-optical-path photoswitch according to an embodiment of the present invention. FIG. 2 is an overall perspective view showing the multi-optical-path photoswitch according to this embodiment. FIG. 3 is a detailed circuit diagram of an essential portion of a light emitting unit 2 of the multi-optical-path photoswitch (having eight optical paths) according to this embodiment.

Referring to FIGS. 1 and 2, the multi-optical-path photoswitch 1 according to the present invention incorporates a light emitting unit 2 and a light receiving unit 3. Light emitting devices 21 of the light emitting unit 2 and light receiving devices 31 of the light receiving unit 3 are disposed opposite to each other. Thus, optical paths (light beams) 5 emitted from the light emitting devices 21 are used to form a detection area.

Referring to FIG. 1, the light emitting unit 2 incorporates a plurality of light emitting devices 21 (211 to 21N), light-emitting-device driving circuits 221 to 22N, a light-emitting-device switching circuit 23, a light-emitting-unit control circuit 24, a voltage detection circuit 25 and a multiple-light-emission detection circuit 26. The light receiving unit 3 incorporates a plurality of light receiving devices 31 (311 to 3 IN), receipt-signal amplifying circuits 321 to 32N, a light-receiving-device switching circuit 33, a light-receiving-circuit control circuit 34, an output circuit 35, a light-receipt-signal processing circuit 36 and a display unit 6.

In the light emitting unit 2, the plural light emitting devices 21 (211 to 21N) are realized by light emitting diodes and so forth such that N light emitting diodes are disposed at a predetermined pitch on a surface facing the light receiving unit 3. The N light emitting devices 211 to 21N are driven and controlled by the light-emitting-device driving circuits 221 to 22N. For example, as shown in FIG. 3, the N light-emitting device driving circuits 221 to 22N, for example, as shown in FIG. 3, are constituted by NPN transistors Q1 to Q8 and resistors R11 to R18 which are, in series. connected between ends of the light emitting devices 211 to 21N having the other ends connected to power supply potential Vcc and ground potential GND so as to be operated and controlled by a switching control operations of the NPN transistors Q1 to Q8.

The light-emitting-device switching circuit 23 and the light-emitting-unit control circuit 24 correspond to a light-emission control means. The light-emitting-unit control circuit 24 transmits, to the light-emitting-device switching circuit 23, a clock for determining predetermined light emission timing. The light-emitting-device switching circuit 23 uses a time division method to scan N light-emitting-device driving circuits 221 to 22N. Similarly to the conventional example, the light-emitting-device switching circuit 23 is constituted by shift registers serially connected to one another so as to sequentially shift states of outputs of the shift t registers at timing represented by the clocks supplied from the light-emitting-unit control circuit 24. Thus, the light-emitting-device driving circuits 221 to 22N are scanned in the time division manner so as to sequentially turn the light emitting devices 211 to 21N on.

The voltage detection circuit 25 corresponds to a voltage detection means which detects operation voltages which are supplied to the N light emitting devices 211 to 21N. In the example of the structure of the circuit shown in FIG. 3, the emitter potentials of the NPN transistors Q1 to Q8 are detected by a star-shape resistance network constituted by combining the resistors R20 to R28 and the diodes D1 to D8. The multiple-light-emission detection circuit 26 corresponds to an abnormal state detection means which detects an abnormal state in the operations of the N light emitting devices 211 to 21N in accordance with the operation voltages detected by the voltage detection circuit 25. In the example of the structure shown in FIG. 3, the multiple-light-emission detection circuit 26 is constituted by two comparators CMP 1 and CMP 2 and resistors Ra, Rb and Rc for generating reference potentials Vab to Vbc. If potential Vn of a junction of the resistance network satisfies a range from a reference potential Vab to Vbc, a determination is made that the state is in a normal state. If the foregoing range is not satisfied, a determination is made that the state is in an abnormal state.

In the light receiving unit 3, the plural light receiving devices 31 (311 to 31N) are realized by phototransistors and so forth and arranged such that N plural light receiving devices 31 (311 to 31N) are disposed at the same pitch as that of the N light-emitting-device driving circuits 221 to 22N of the light emitting unit 2. The light receiving devices 311 to 3 1N are amplified by receipt-signal amplifying circuits 321 to 32N, respectively.

The light-receiving-device switching circuit 33 and the light-receiving-circuit control circuit 34 correspond to the light-receipt control means. The light-receiving-circuit control circuit 34 transmits, to the light-receiving-device switching circuit 33, a clock in synchronization with the light emission timing. The light-receiving-device switching circuit 33 uses the time division method to scan the N receipt-signal amplifying circuits 321 to 32N. That is, the N light receiving devices 311 to 31N are selectively operated such that they are operated at only the light emission timing of corresponding N light emitting devices 211 to 21N. Thus, inhibition of response to light emitted from a light emitting device which emits light at timing other than the timing set to the light emitting device is performed. That is, the light-receiving-device switching circuit 33 is constituted by shift registers or the like which are connected serially, similarly to the conventional example. At the timing represented by the clock supplied from the light-receiving-circuit control circuit 34, the receipt-signal amplifying circuits 321 to 32N are scanned by the time division manner. Thus, light-receipt signals transmitted from the receipt-signal amplifying circuits 321 to 32N are transmitted to the light-receipt-signal processing circuit 36.

The display unit 6 displays a state of the multi-optical-path photoswitch 1. If the display unit 6 incorporates one display unit which is able to display red and green indications, the display unit 6 emits green light in a state where all of optical paths coincide with each other. In the other cases, the display unit 6 emits red light. If a single display lamp is employed, the lamp is turned on when all of the optical paths coincide with each other, In the other cases, the lamp is turned off. If the abnormal operation is detected, the display unit emits flashing light. Although the display unit 6 is, in this embodiment, provided for the light receiving unit 3, the display unit 6 may be provided for the light emitting unit 2 or each of the light emitting unit 2 and the light receiving unit 3.

The light-receipt-signal processing circuit 36 is constituted by, for example, an amplifying circuit for amplifying the light-receipt signal, a binary-coding circuit which subjects the amplified light-receipt signal to comparisons with a predetermined threshold value so as to convert the light-receipt signal into a binary signal which indicates whether or not the state is a light-receipt signal or a light shielded state and a wave detection circuit for determining a state of light incidence in response to the binary signal. An output of the light-receipt-signal processing circuit 36 is supplied to the light-receiving-circuit control circuit 34. The light-receiving-circuit control circuit 34 determines that no object has passaged into the detection area in a light receipt state in which all of the optical paths coincide with each other. If one or more optical paths are in the light shielded state and thus the light shielded light shielded state is realized, the light-receiving-circuit control circuit 34 determines passage of an object into the detection area. A result of the determination is, through the output circuit 35, a pressing machine or the like provided with the multi-optical-path photoswitch 1. Thus, control is performed to, for example, interrupt the operation.

Figure 4:
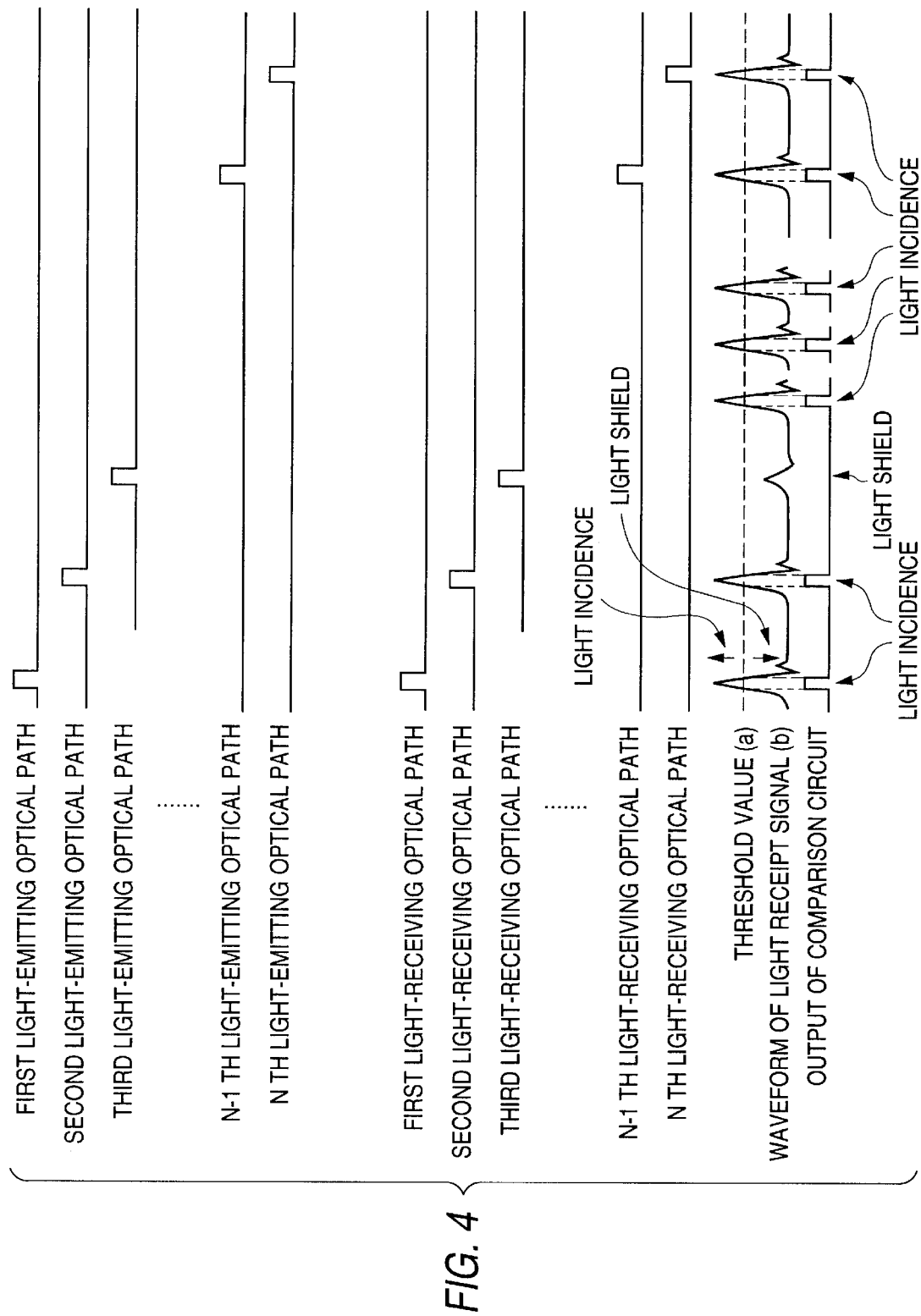
FIG. 4 is a timing chart showing an essential portion of the multi-optical-path photoswitch according to the embodiment of the invention.
Figure 5:
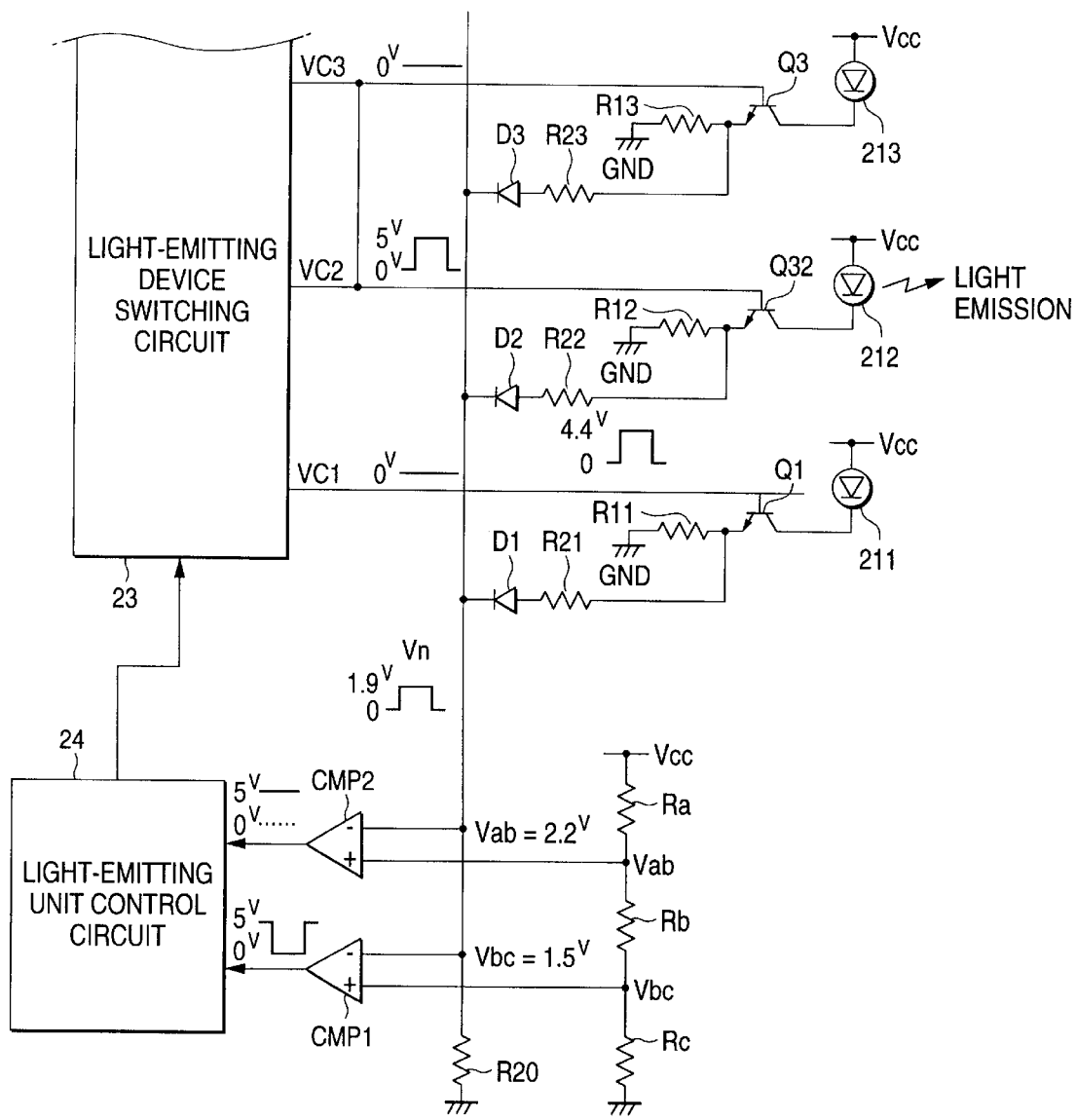
FIG. 5 is a diagram showing a partial structure and operation of the light emitting unit which is performed. in a normal state.
Figure 6:
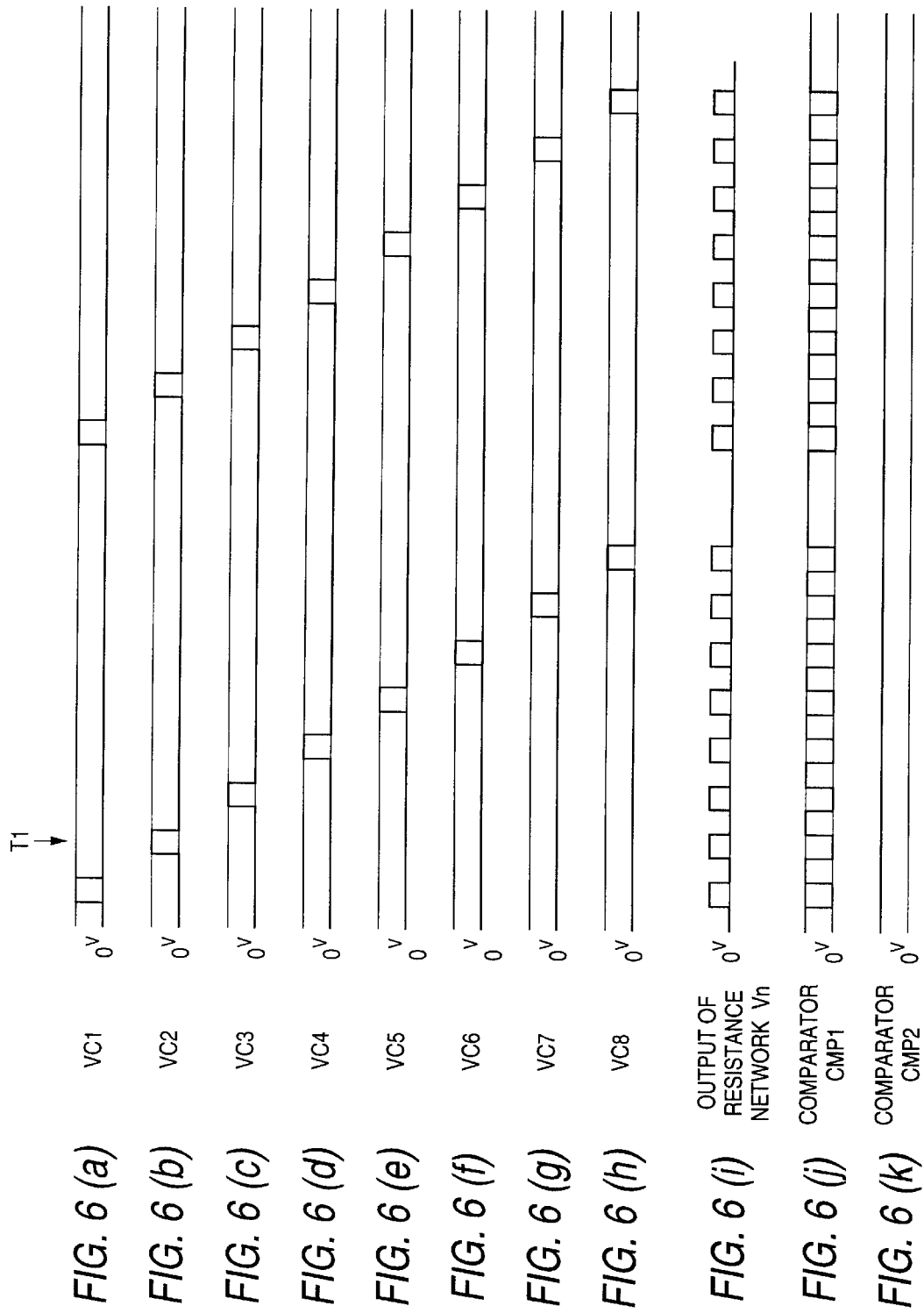
FIG. 6a to 6k comprise a timing chart of an essential portion of the light emitting unit in a normal operation state.
Figure 7:
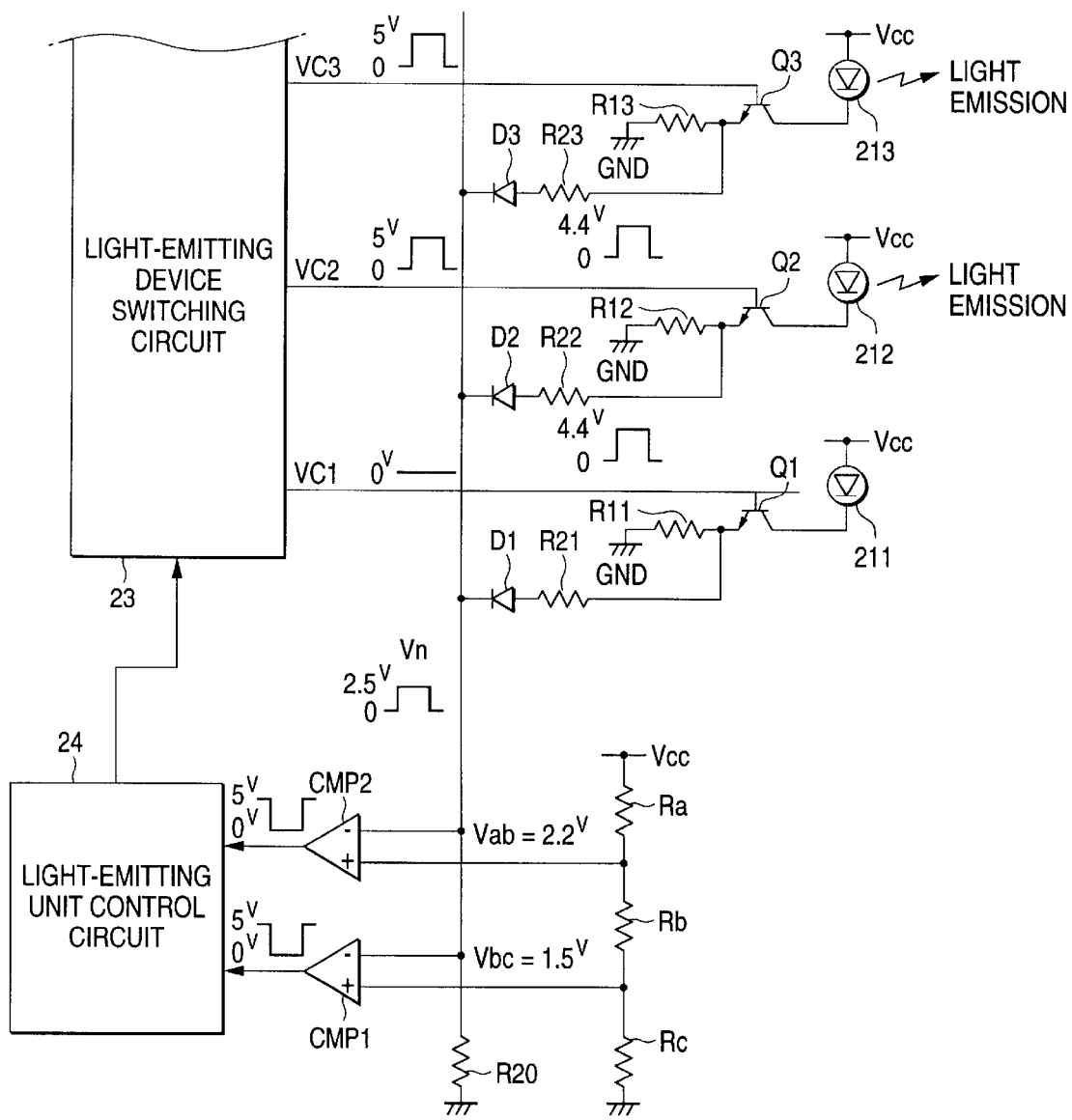
FIG. 7 is a diagram showing a partial structure of the light emitting unit in a case of an abnormal operation (in a case of occurrence of multiple light emission)
Figure 8:
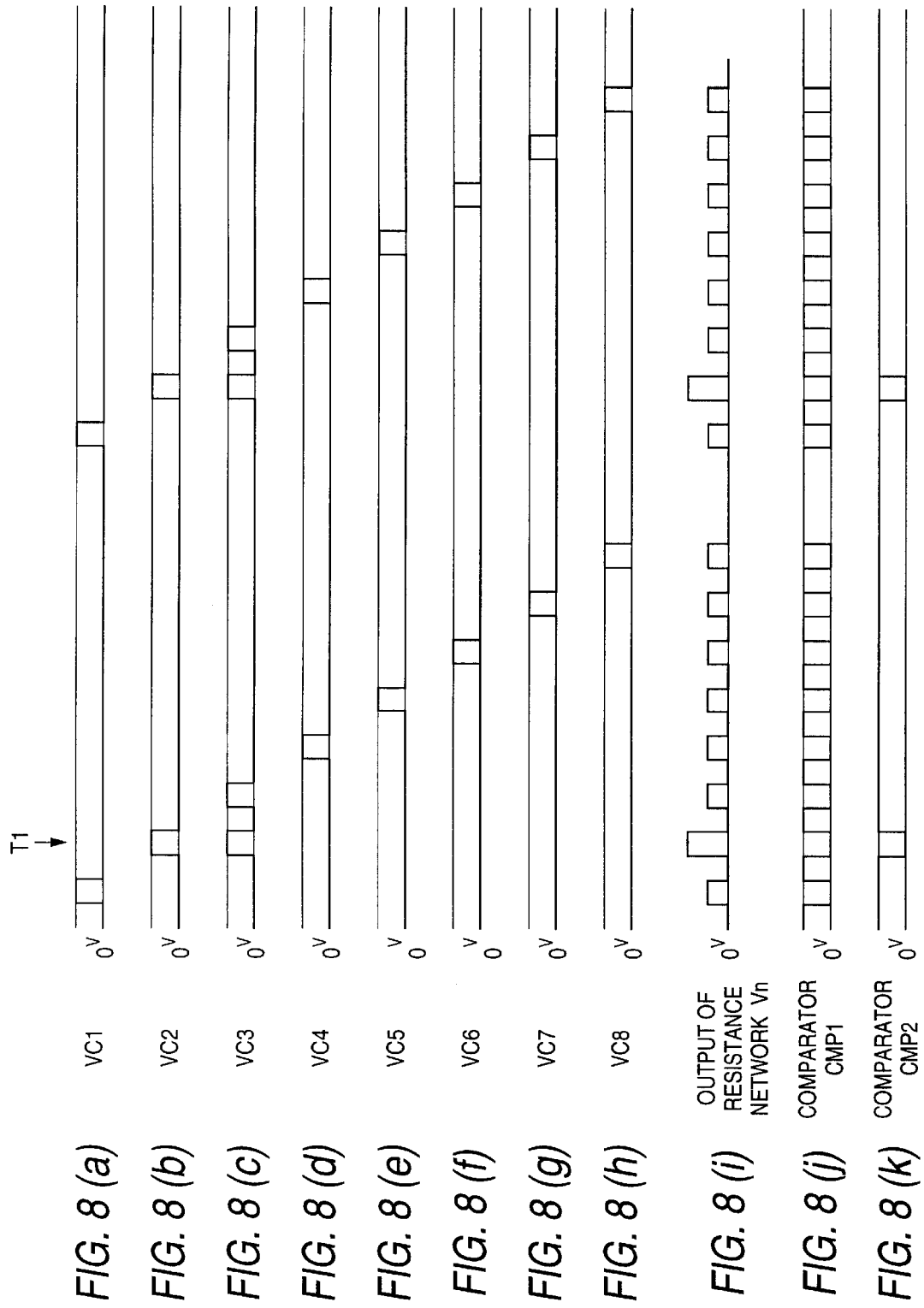
FIG. 8a to 8k comprise a timing chart of an essential portion of the light emitting unit in a case of an abnormal operation (in a case of occurrence of multiple light emission)
Figure 9:
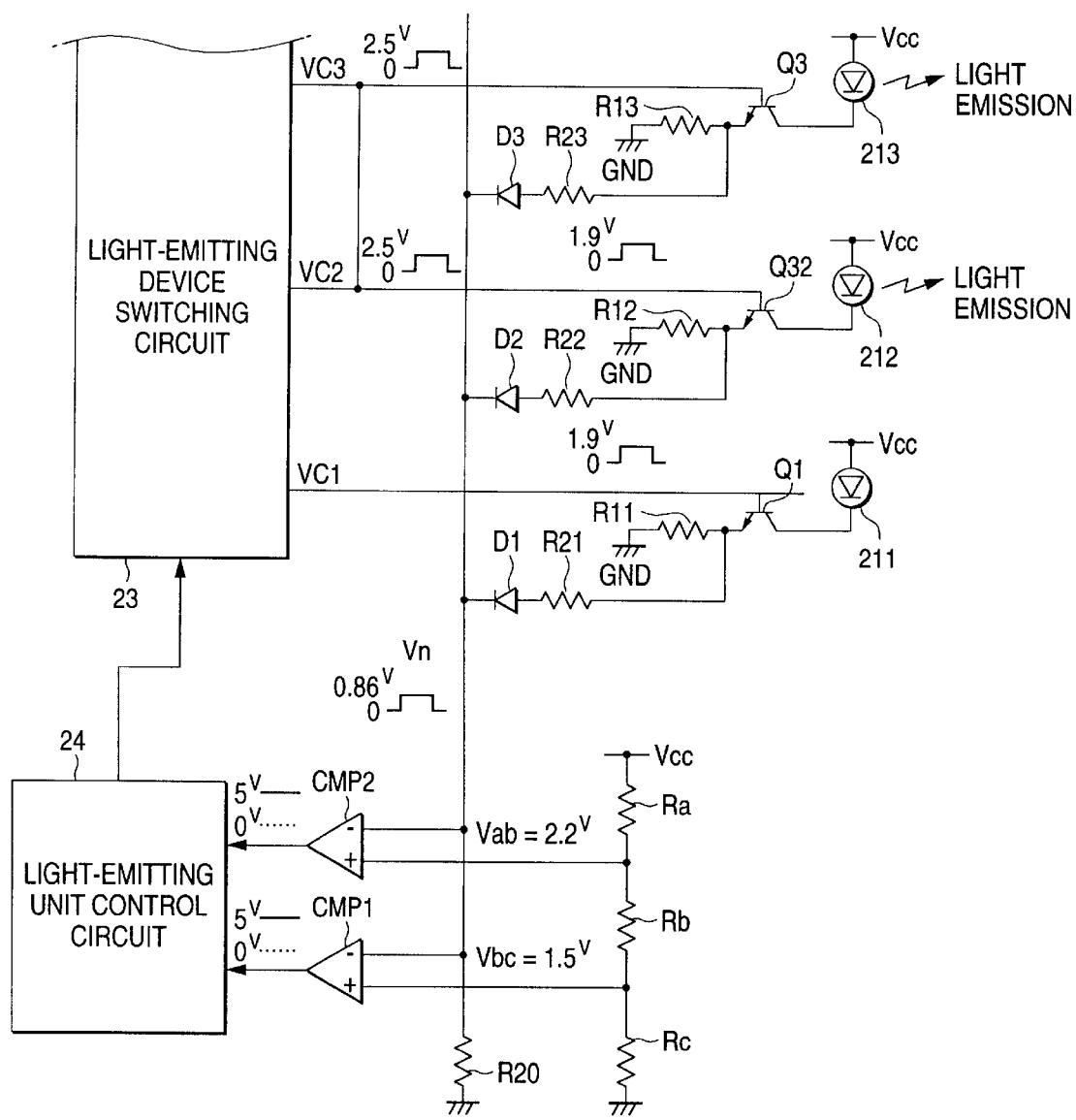
FIG. 9 is a diagram showing a partial structure of the light emitting unit in a case of an abnormal operation (in a case of occurrence of short circuit)
Figure 10:
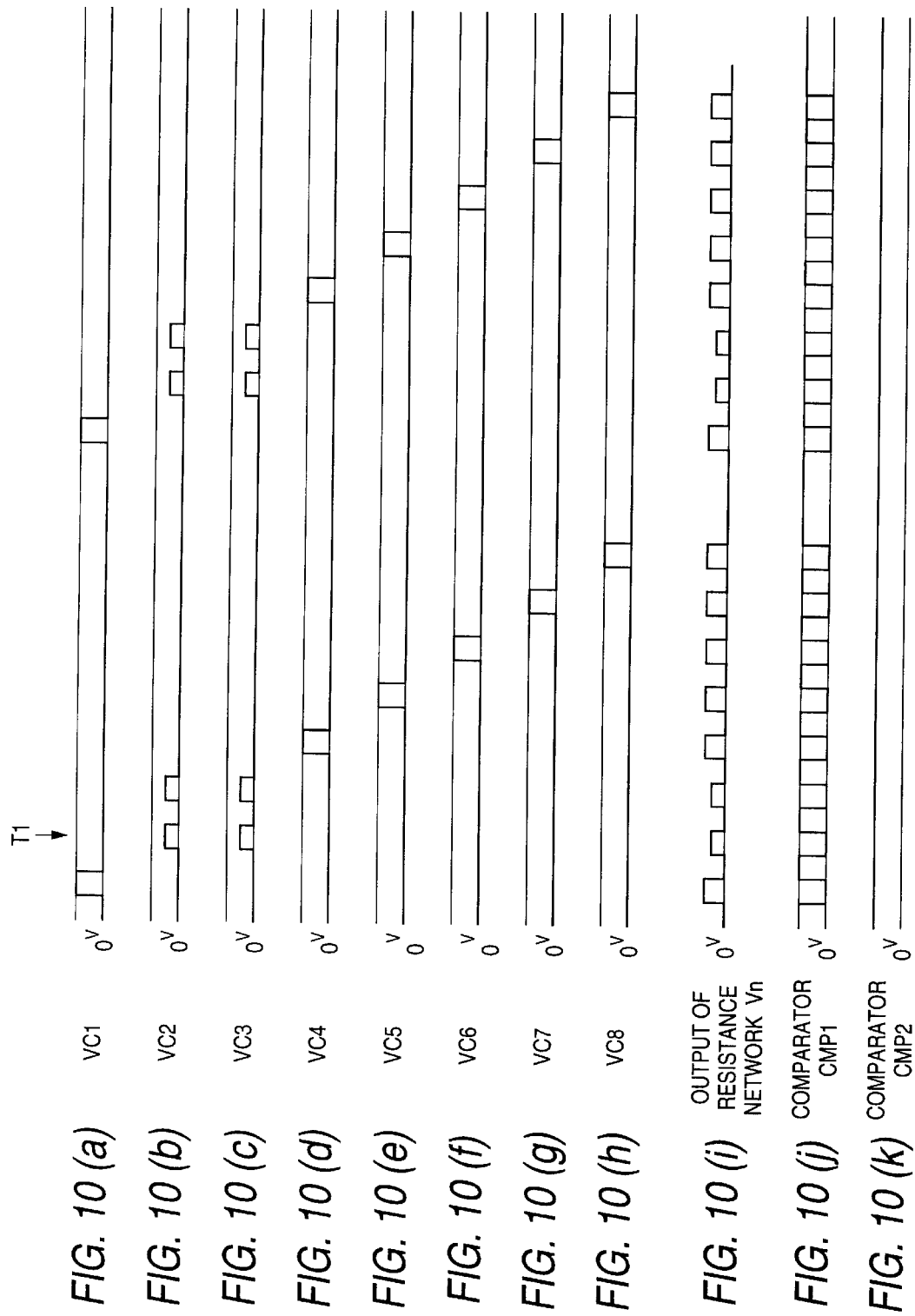
FIG. 10a to 10k comprise a timing chart of an essential portion of the light emitting unit in a case of an abnormal operation (in a case of occurrence of short circuit)

The operation of the multi-optical-path photoswitch 1 having the above-mentioned structure and according to this embodiment will now be described with reference to the drawings. The basic structure will now be described with reference to FIG. 4. The operations of the voltage detection circuit 25 and the multiple-light-emission detection circuit 26 for preventing incorrect detection in an abnormal state will now be described with reference to FIGS. 5 to 10, the operation for preventing incorrect detection being a characteristic of this embodiment. FIG. 4 is a timing chart of an essential portion of the multi-optical-path photoswitch 1. FIG. 5 is a diagram showing the partial structure of the light emitting unit 2 and the operation which is performed in a normal state. FIG. 6 is a timing chart showing an essential portion of the operation of the light emitting unit 2 which is performed in a normal state. FIG. 7 is a diagram showing the partial structure and the operation of the light emitting unit 2 which is performed in an abnormal state (in a state of occurrence of multiple light emission). FIG. 8 is a timing chart of the operation of the light emitting unit 2 in an abnormal state (in a state of occurrence of multiple light emission). FIG. 9 is a diagram showing the operation of an essential portion of the structure of the light emitting unit 2 which is performed in a state of occurrence of abnormal state (generation of short circuit). FIG. 10 is a timing chart of an essential portion of the operation of the light emitting unit 2 which is performed in a state of abnormal state (generation of short circuit).

The basic structure of the multi-optical-path photoswitch 1 according to this embodiment will now be described. The light-emitting-device driving circuits 221 to 22N cause the light emitting devices 211 to 21N of the light emitting unit 2 to cyclically emit scanning light at predetermined intervals. In synchronization with the light emission timing, also the receipt-signal amplifying circuits 321 to 32N of the light receiving unit 3 cyclically receive scanning light to detect whether each of the optical paths is receiving light or not.

That is, light is emitted from the light emitting unit 2 at a timing as shown in the waveforms of signals which are emitted by a first light-emitting optical-path to an N the light emitting optical-path as shown in FIG. 4. The light-emitting-unit control circuit 24 controls the timing so that the light emitting device 211 to 21N sequentially emit scanning light through the light-emitting-device switching circuit 23 and the light-emitting-device driving circuits 221 to 22N.

In the light receiving unit 3, light receiving timing for a first light receiving optical-path to an N the light receiving optical-path as shown in FIG. 4 is realized. To realize the foregoing timing, the light-receiving-circuit control circuit 34 controls the timing to cause the receipt-signal amplifying circuit 311 to 31N of the light receiving devices 311 to 31N to be operated. Thus, scanning light receipt is performed. The synchronization between the light emitting timings, which is realized by the light-emitting-unit control circuit 24, and the light receiving timing which is realized by the light-receiving-circuit control circuit 34, is established by transmitting a synchronization recognition pulse pattern from the light receiving unit 3 to the light emitting unit 2 through the signal line 8. As an alternative to the method using the foregoing electric signal, it might be considered feasible to employ a method with which an optical burst signal is transmitted. If the state is, in the foregoing case, displayed by the display unit of the light receiving unit 3, the signal line 8 between the light emitting unit 2 and the light receiving unit 3 is not required.

The light-receipt signal which is transmitted by the light receiving unit 3 is performed as shown in FIG. 4. That is, the light-receipt signals of the first optical-path to the N the light receiving device (outputs of the receipt-signal amplifying circuits 321 to 32N) are amplified by the amplifying circuit of the light-receipt-signal processing circuit 36. The binary-coding circuit compares the amplified light-receipt signals (analog outputs) with a predetermined threshold value so as to convert the signals into binary signals indicating whether each state is a light receipt state or the light shielded state (refer to (a) and (b) of FIG. 4). That is, if the level of the amplified light-receipt signal is higher than the threshold value, a light receipt state is determined and a pulse is transmitted (value 1). If the level is not higher than the threshold value, a light shielded state is determined and transmission of the pulse is inhibited (value 0). In response to a signal detected by the wave detection circuit, the light-receiving-circuit control circuit 34 determines no passage of an object into the detection area if all of the optical paths are in the light receipt state. If one or optical paths are brought to the light shielded state, a determination of passage of an object into the detection area is determined.

The operation of an essential portion of the light emitting unit 2 which is performed to prevent incorrect detection which occurs when the operation of the multi-optical-path photoswitch 1 according to this embodiment is abnormal will now be described.

In the following description, an assumption is made that eight optical paths from a first optical-path to an eighth optical-path are provided and reference potentials Vab to Vbc which are generated by resistors Ra, Rb and Rc are 2.2 V and 1.5 V. If the potential Vn at the junction of the resistance network satisfies a range from the reference potential Vab=2.2 V to Vbc=1.5 V, a normal state is determined. If the foregoing range is not satisfied, an abnormal state is determined.

The operation of an essential portion of the light emitting unit 2 (the voltage detection circuit 25 and the multiple-light-emission detection circuit 26) which is performed in a normal operation state in which no multiple light emission and short circuit takes place will now be described with reference to FIGS. 5 and 6. FIG. 5 shows light emitting devices 211 to 213 from the first optical-path to the third optical-path, the light-emitting-device driving circuits 221 to 223 and a part of the connected voltage detection circuit 25 (a resistance network). Waveforms of voltages are those at the light emission timing of the second optical-path (corresponding to timing T1 shown in FIG. 6).

In the light emitting unit 2, the voltage waveforms of operating voltages VC 1 to VC 8 which are outputs of the light-emitting-device switching circuit 23 are sequentially and cyclically developed to cause the light emitting devices 211 to 21N to emit scanning light, as shown in (a) to (h) of FIG. 6. At light emission timing T1 of the second optical-path, the operating voltages VC 1 to VC 3 (see FIG. 5) applied from the light-emitting-device switching circuit 23 are such that only the operating voltages VC 2 is 5 V and the other operation voltages are 0 V. Therefore, only a transistor Q2 of the light-emitting-device operation circuit 222 is turned on so that a predetermined electric current flows in the light emitting device 212. Thus, only the light emitting device 212 emits light.

At this time, the potential at the junction between the light-emitting-device driving circuit 222 and the voltage detection circuit 25 (the resistance network), that is, the emitter potential of the NPN transistor Q2 is about 4.4 V. The potential Vn at the junction of the resistance network is made to be about 1.9 V (refer to (i) of FIG. 6) by dint of the voltage division performed by the resistors R20 to R28 (refer to (i) of FIG. 6). The potential Vn=1.9 V at the junction of the resistance network is not lower than reference potential Vbc=1.5 V at the comparator CMP 1, the comparator CMP 1 produces an output of 0 V (value 0) (refer to (j) of FIG. 6). Since the reference potential Vab is 2.2 V or lower at the comparator CMP 2, the comparator CMP 2 produces an output of 5 V (value 1)(see (k) of FIG. 6). That is, the potential Vn at the junction of the resistance network satisfies the range from reference potential Vab=2.2 V to Vbc=1.5 V. Therefore, a normal operation is determined.

The operation of an essential portion of the light emitting unit 2 (the voltage detection circuit 25 and the multiple-light-emission detection circuit 26) of the light emitting unit 2 which is performed in an abnormal state in which multiple light emission occurs by dint of a breakdown of a control circuit, such as the light-emitting-device switching circuit 23 will now be described with reference to FIGS. 7 and 8. Similarly to FIG. 5, FIG. 7 shows the light emitting devices 211 to 213 of the first optical-path to the third optical-path, the light-emission-device driving circuits 221 to 223 and a portion of the connected voltage detection circuit 25 (the resistance network). Waveforms of voltages are those at the light emission timing of the second optical-path (corresponding to timing T1 shown in FIG. 8).

In the light emitting unit 2, as shown in (a) to (h) of FIGS. 8, the voltage waveforms of operating voltages VC 1 to VC 8 which are outputs of the light-emitting-device switching circuit 23 are sequentially and cyclically developed to cause the light emitting devices 211 to 21N to emit scanning light. If multiple light emission of the second optical-path and that of the third optical-path occur at light emission timing T1 of the second optical-path, the operating voltages VC 1 to VC 3 (see FIG. 7) applied from the light-emitting-device switching circuit 23 are such that each of operation voltages VC 2 and VC 3 is 5 V and the each of the other operation voltages is 0 V. Therefore, the transistors Q2 and Q3 of the light-emitting-device driving circuits 222 and 223 are turned on so that the light emitting devices 212 and 213 emit lights.

At this time, the emitter potential of each of the NPN transistors Q2 and Q3 is about 4.4 V and the potential Vn of the junction of the resistance network is made to be about 2.5 V because of voltage division performed by the resistors R20 to R28 (refer to (i) of FIG. 8). Since the potential Vn at the junction of the resistance network is 2.5 V and the reference potential Vbc=1.5 V or higher at the comparator CMP 1, the output of the comparator CMP 1 is made to be 0 V (value 0)(see (j) of FIG. 8). Since the reference potential Vab is 2.2 V or higher at the comparator CMP 2, also the output of the comparator CMP 2 is made to be 0 V (value 0) (see (k) of FIG. 8). That is, when the potential Vn at the junction of the resistance network does not satisfy the range from the reference potential Vab=2.2 V to Vbc=1.5 V, an abnormal state is determined.

The operation of an essential portion (the voltage detection circuit 25 and the multiple-light-emission detection circuit 26) which is performed in an abnormal state by which short circuit takes place will now be described with reference to FIGS. 9 and 10. Similarly to FIG. 5, FIG. 9 shows the light emitting devices 211 to 213 from the first optical-path to the third optical-path, light-emitting-device driving circuits 221 to 223 and a portion of the connected voltage detection circuit 25 (the resistance network). Voltage waveforms shown in the drawing indicate those at the light emission timing (corresponding to timing T1 shown in FIG. 8) of the second optical-path.

In the light emitting unit, voltage waveforms of operation voltages VC 1 to VC 8 which are outputs of the light-emitting-device switching circuit 23 are sequentially and cyclically developed to cause the light emitting devices 211 to 21N to emit scanning light, as shown in (a) to (h) of FIG. 10. If the signal line is short-circuited between the operation voltages VC 2 and VC 3 which are outputs of the light-emitting-device switching circuit 23, the operation voltages VC 1 to VC 3(FIG. 9) applied from the light-emitting-device switching circuit 23 are such that each of the operation voltage VC 2 and VC 3 is 2.5 V and the other operation voltage is 0 V in a case where the output impedance of VC 2 and VC 3 are the same. The reason for this lies in that VC 2 is 5.0 V and VC 3 is 0 V when no short-circuit takes place. Therefore, the transistors Q2 and Q3 of the light-emitting-device driving circuits 222 and 223 are turned on. Thus, the light emitting devices 212 and the 213 emit lights.

At this time, the emitter potential of the NPN transistors Q2 and Q3 is about 1.9 V and the potential Vn at the junction of the resistance network is about 0.86 V because of voltage division performed by the resistors R20 to R28 (refer to (i) of FIG. 10). Since the potential Vn=0.86 V at the junction of the resistance network and the reference potential Vbc at the comparator CMP 1 is 1.5 V lower, the comparator CMP 1 produces an output of 5 V (value 1)(refer to j) of FIG. 10). Since the reference potential Vab=2.2 V or lower at the comparator CMP 2, also the output of the comparator CMP 2 is made to be 5 V (value 1)(refer to (k) of FIG. 10). That is, the potential Vn at the junction point of the resistance network does not satisfy the range from the reference potential Vab=2.2 V to Vbc=1.5 V. Therefore, an abnormal state is determined.

In this embodiment, the outputs of the comparators CMP 1 and CMP 2 are 0 V (value 0) when multiple light emission takes place. On the other hand, when short-circuit takes place between the output terminals of the light-emitting-device switching circuit 23, each of the outputs of the comparators CMP 1 and CMP 2 is made to be 5 V (value 1). Therefore, a type of the abnormal states (whether multiple light emission takes place or short circuit takes place) can be detected by combining the output values of the comparators CMP 1 and CMP 2.

Electric currents which flow in the light emitting devices 211 to 218 corresponding to the foregoing optical paths are set by the values of the resistors R11 to R18. When individual electric current values are set to the optical paths, the resistance values of the resistors R11 to R18 are required to be changed. Even in the above-mentioned case, the difference in the voltage between the emitter terminals of the NPN transistors among the optical paths is sufficiently small because the output resistance of each of the emitter follower circuit for use in the light-emitting-device driving circuits 221 to 228 is enough low value. Therefore, no problem arises when the circuit is operated.

As described above, the multi-optical-path photoswitch according to this embodiment has the structure that the voltage detection circuit 25 detects operation voltages which are supplied to N light emitting devices 211 to 21N. The multiple-light-emission detection circuit 26 detects an abnormal states of each of the N light emitting devices 211 to 21N in accordance with the operation voltages detected by the voltage detection circuit 25. Therefore, any abnormal states of the light emitting device can be detected, such as multiple light emission, which is generated when an incorrect signal is supplied to the light emitting devices 211 to 21N, for example, by setting of incorrect data which occurs when the control circuit (the light-emitting-unit control circuit 24, the light-emitting-device switching circuit 23 or the like) of the light emitting devices is broken or noises are generated or when the signal lines of the control of the light emitting devices are short-circuited because of passage of metal foreign material or a bridge of solder when elements are mounted on a substrate.

In this embodiment, the output values of the comparators CMP 1 and CMP 2 of the multiple-light-emission detection circuit 26 are combined so that the type of the abnormal states (whether multiple light emission or short circuit has occurred) can be detected. Since the resistance network of the voltage detection circuit 25 requires only one multiple-light-emission detection circuit 26 to detect an abnormal states of any of the optical paths, the size of the circuit can be reduced. Since the method monitoring the waveforms of operation voltages of the light-emitting-device driving circuits 221 to 22N is employed, any influence of an electric current which flows in each of the light emitting devices 211 to 21N is not exerted on setting an optimum electric current value for each of the optical paths. Thus, the design freedom can be also improved.

Figure 11:
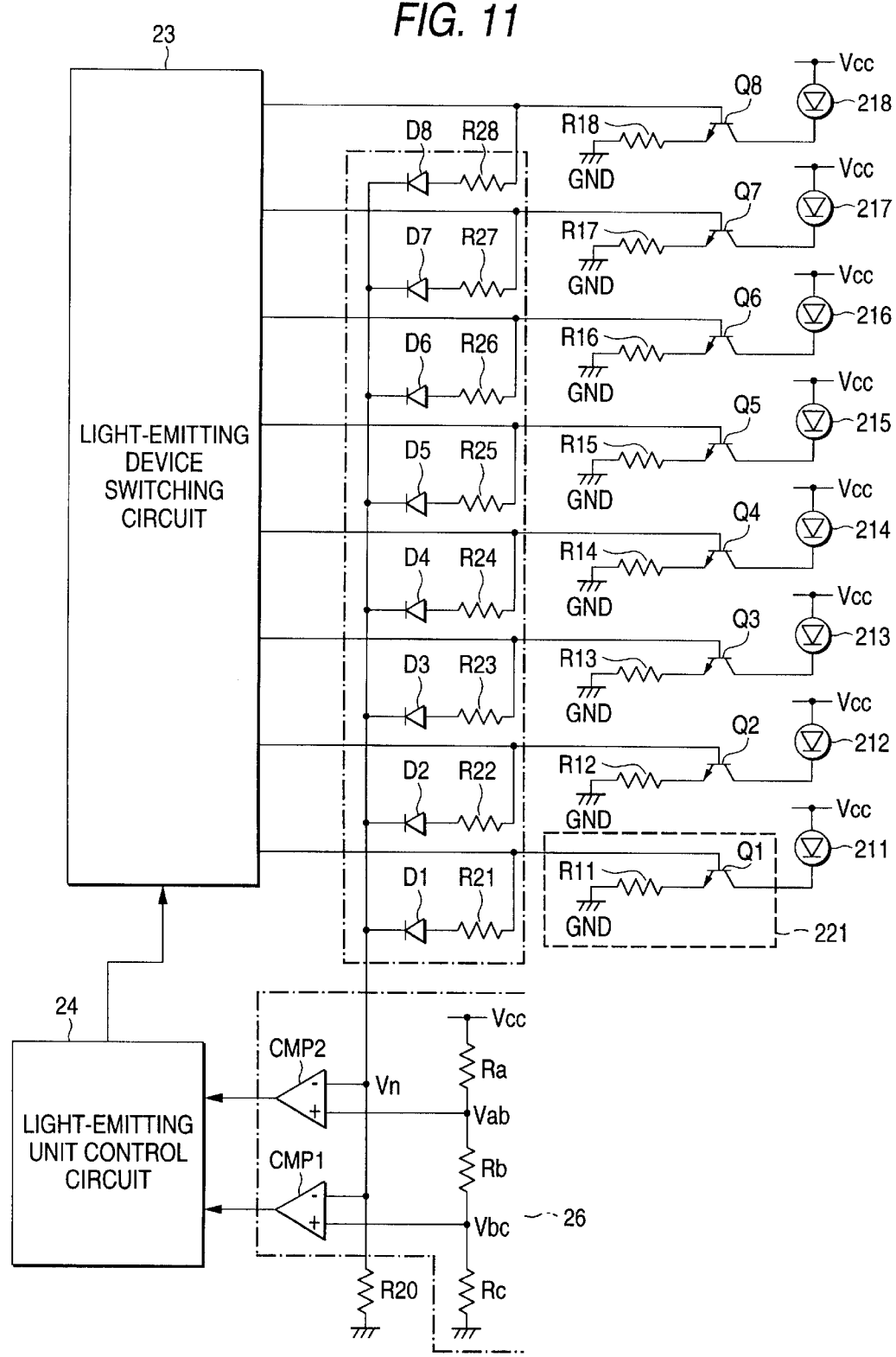
FIG. 11 is a detailed circuit diagram showing an essential portion of the light emitting unit of a multi-optical-path photoswitch according a modification.
Figure 12:
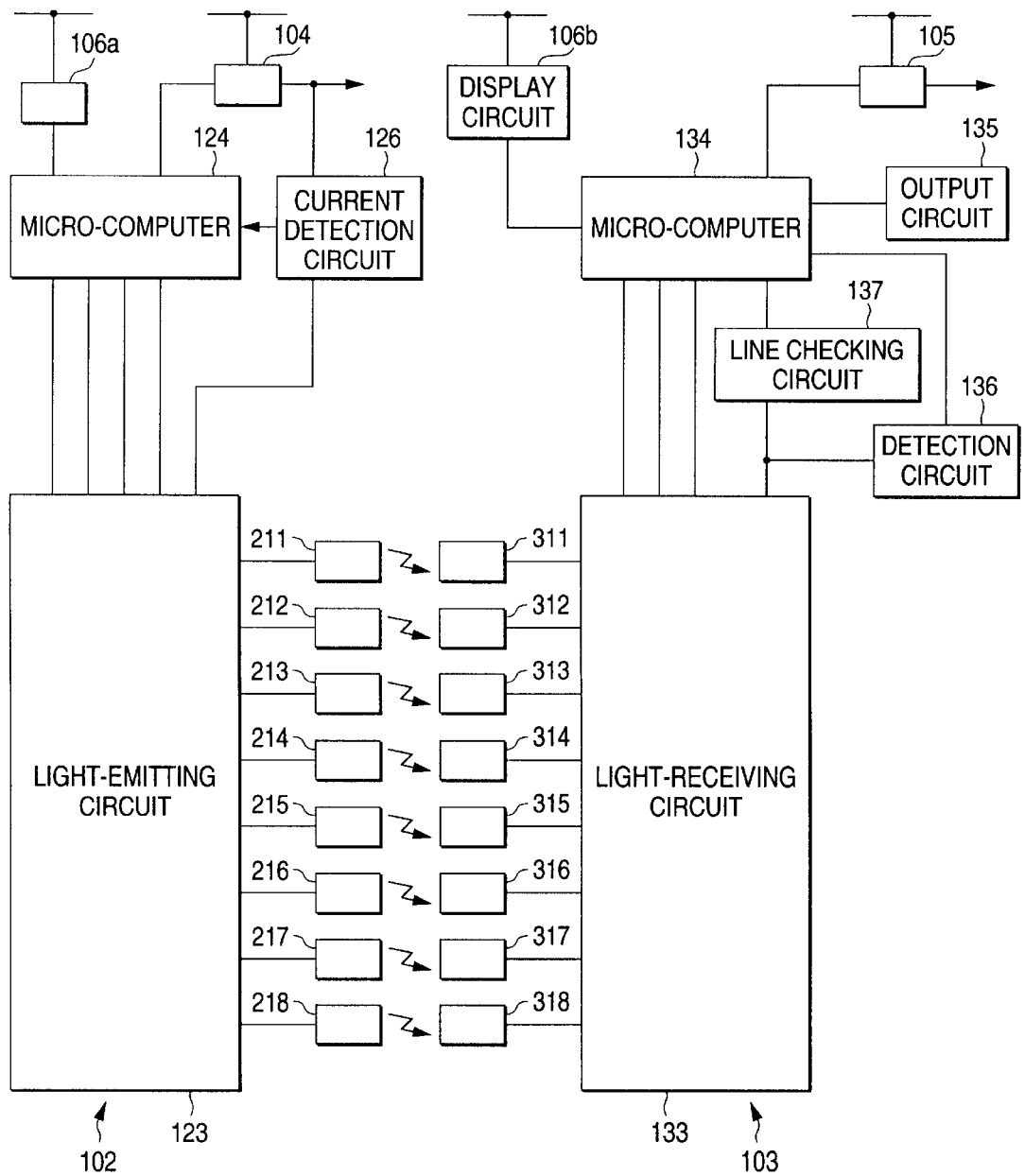
FIG. 12 is an overall structural view showing a conventional multi-optical-path photoswitch.
Figure 13:
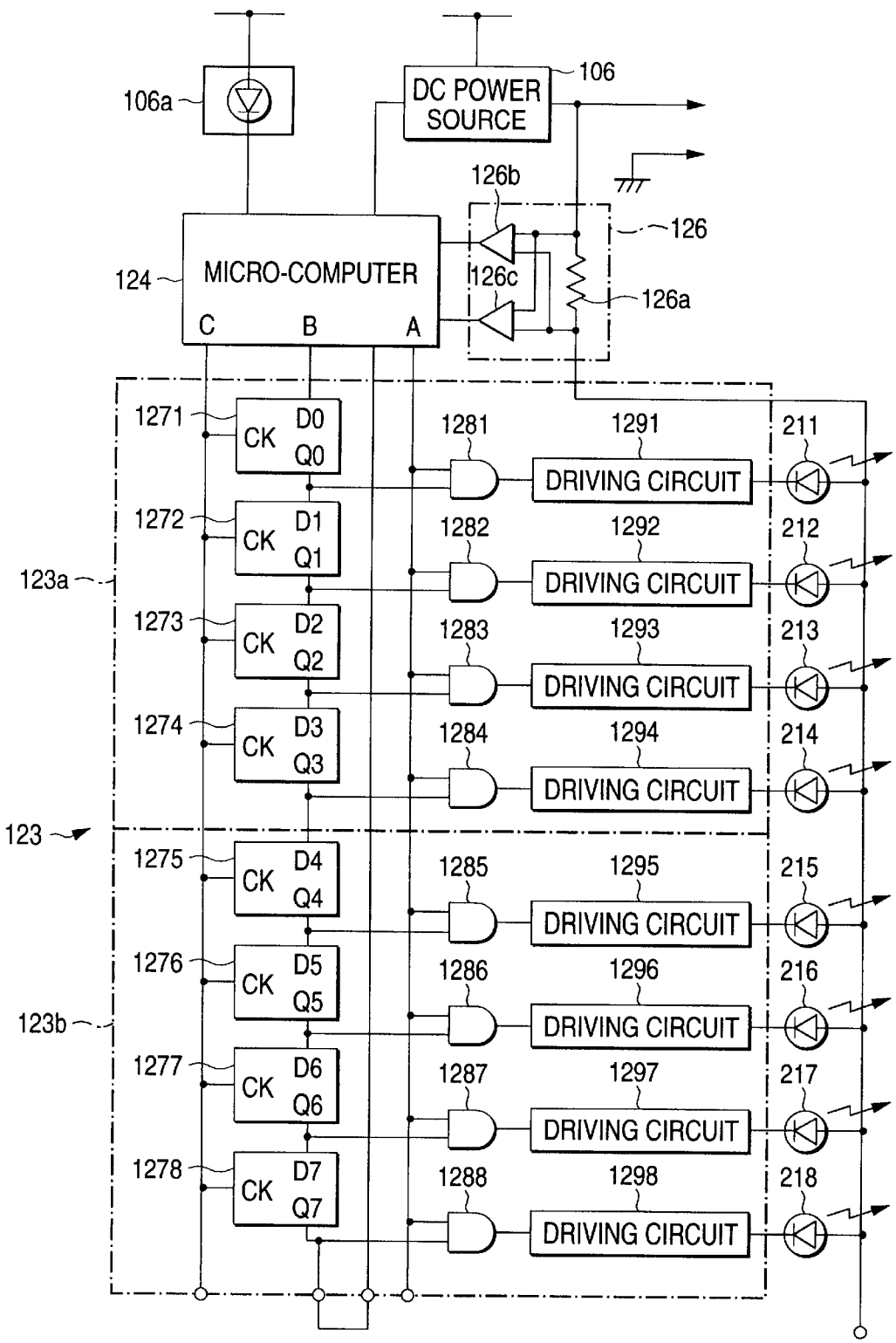
FIG. 13 is a circuit diagram showing a light emitting unit of the conventional multi-optical-path photoswitch.

As a modification of the multi-optical-path photoswitch 1 according to the abovementioned embodiment, another example of the circuit structure of the voltage detection circuit 25 will now be described. FIG. 11 is a detailed circuit diagram of an essential portion of the light emitting unit 2 of a multi-optical-path photoswitch according to this modification (in which eight optical paths are provided). The foregoing drawing is substituted for FIG. 3 showing the above-mentioned embodiment.

That is, referring to FIG. 11, the voltage detection circuit 25 detects operation voltages which are supplied to the light emitting devices 211 to 218. Thus, the base potentials of the NPN transistors Q1 to Q8 (an output of the light-emitting-device switching circuit 23) are detected by a star-shape resistance network constituted by resistors R20 to R28 and diodes D1 to D8. The multiple-light-emission detection circuit 26 is constituted by two comparators CMP 1 and CMP 2 and resistors Ra, Rb and Rc for generating reference potentials Vab and Vbc. If the potential Vn at the junction of the resistance network satisfies a range from reference potential Vab to Vbc, a normal state is determined. If the range is not satisfied, an abnormal operation is determined.

In comparison with the structure of the circuit shown in FIG. 3, the voltage detection circuit according to this modification is different in positions at which voltage waveforms of the light-emitting-device driving circuits 221 to 22N of the corresponding optical paths are extracted. That is, the connection to the resistance network is established at a base terminal of each of the NPN transistors Q1 to Q8. Also in this modification, the light-emitting-device driving circuits 221 to 22N employ emitter follower circuits constituted by NPN transistors. Therefore, waveforms of voltages supplied to the resistance network are higher than those according to the foregoing embodiment (having the structure shown in FIG. 3) by voltage Vbe between the base and the emitter of the NPN transistor. Therefore, when the reference potentials Vab and Vbc of the multiple-light-emission detection circuit 26 are set to be values higher than the voltage Vbe between the base and the emitter, the description made with reference to FIGS. 5 to 10 showing the foregoing embodiment can be applied as it is. As a matter of course, similar effects with those of the above-mentioned effect can be obtained.

As described above, the multi-optical-path photoswitch according to the present invention has the structure that the voltage detection means detects the operation voltages which are supplied to the plural light emitting devices and the abnormal state detection means detects abnormal operations of the plural light emitting devices in accordance with the operation voltages detected by the voltage detection means. Therefore, any abnormal operation of the light emitting device, such as multiple light emission, can be detected which is generated when an incorrect signal is supplied to the light emitting devices, for example, setting of incorrect data which occurs when the control circuit (the light-emitting-unit control circuit, the light-emitting-device switching circuit 23 or the like) of the light emitting devices is broken or noise is generated or when the signal lines of the control of the light emitting devices are short-circuited because of passage of metal foreign material or a bridge of solder when elements are mounted on a substrate. As a result, a multi-optical-path photoswitch can be provided which is able to prevent incorrect detection occurring when multiple light emission state is generated and which is furthermore reliably detect a light shielded state.

The multi-optical-path photoswitch according to the present invention incorporates the voltage detection means which detects light-emission-timing signals or voltages of the plural switching means arranged to be switched on/off in response to light-emission-timing signals. If voltages which are detected depending on causes of abnormal operations are previously recognized, the voltage detection means is able to detect the cause of the abnormal operation in accordance with the voltage level detected by the voltage detection means. If the voltage detection means is realized by the start-shape resistance network or the like so as to detect an abnormal operation by the multiple-light-emission detection means in accordance with one voltage level, the size of the circuit can be reduced. Since the method monitoring the operation voltages which are supplied to the light emitting devices is employed, no influence of the values of electric currents which flow in the light emitting devices is exerted on setting optimum electric current values for the optical paths. Therefore, also design freedom can be improved.

What is claimed is:

1. A multi-optical-path photoswitch comprising:
   a plurality of light emitting devices for emitting a light by each of said light emitting devices;
   light-emission control means for generating a light-emission-timing signal for determining predetermined light emission timing;
   light-emitting-device driving circuits for sequentially driving said plural light emitting devices in response to said light-emission-timing signals supplied from said light-emission control means;
   a plurality of light receiving devices, each receiving said light emitted from said respective light emitting device;
   light-receipt control means for generating a light-receipt signal incoming from said plural light receiving devices in synchronization with the light-emission-timing signals;
   voltage detection means for detecting an operating voltage at either one of an input side or an output side of each of said light-emitting-device driving circuits; and
   abnormal state detection mearis for detecting abnormal operations of said plural light emitting devices in accordance with said operating voltages detected by said voltage detection means.

2. A multi-optical-path photoswitch according to claim 1, wherein
   said operating voltage detected at said input side by said voltage detection means is a voltage of said light-emission-timing signal.

3. A multi-optical-path photoswitch according to claim 1, wherein
   said light-emitting-device driving circuits have a plurality of switching means for turning on or off an electric current which is supplied to each of said light emitting devices in response to said light-emission-timing signal supplied to each of said light emitting devices, and
   said operating voltage detected at said output side by said voltage detection means is a voltage of an output voltage of said switching means.

4. A multi-optical-path photoswitch according to any one of claims 1 to 3, wherein
   said voltage detection means has a resistance network for collecting said operating voltages of said light-emitting-device driving circuits into one voltage, and
   said abnormal state detection means is a comparison circuit which receives an output signal of said resistance network at an end thereof and receives a reference potential signal of said comparison circuit, which produces an abnormal state signal.

5. A multi-optical-path photoswitch according to claim 4, wherein
   said abnormal state detection means has a first and second comparison circuits,
   a reference potential of said first comparison circuit is lower than a value of an output of said resistance network which is produced when more than one light emitting device emit lights simultaneously because of malfunction of said light-emission control means and higher than a value of an output of said resistance network which is produced in a normal state,
   a reference potential of said second comparison circuit is higher than a value of an output of said resistance network which is produced when more than one light emitting device emit lights simultaneously because of short circuit between output terminals of said light-emission control means and lower than a value of an output of said resistance network which is produced in a normal state.

* * * * *